UNITED STATES PATENT OFFICE.

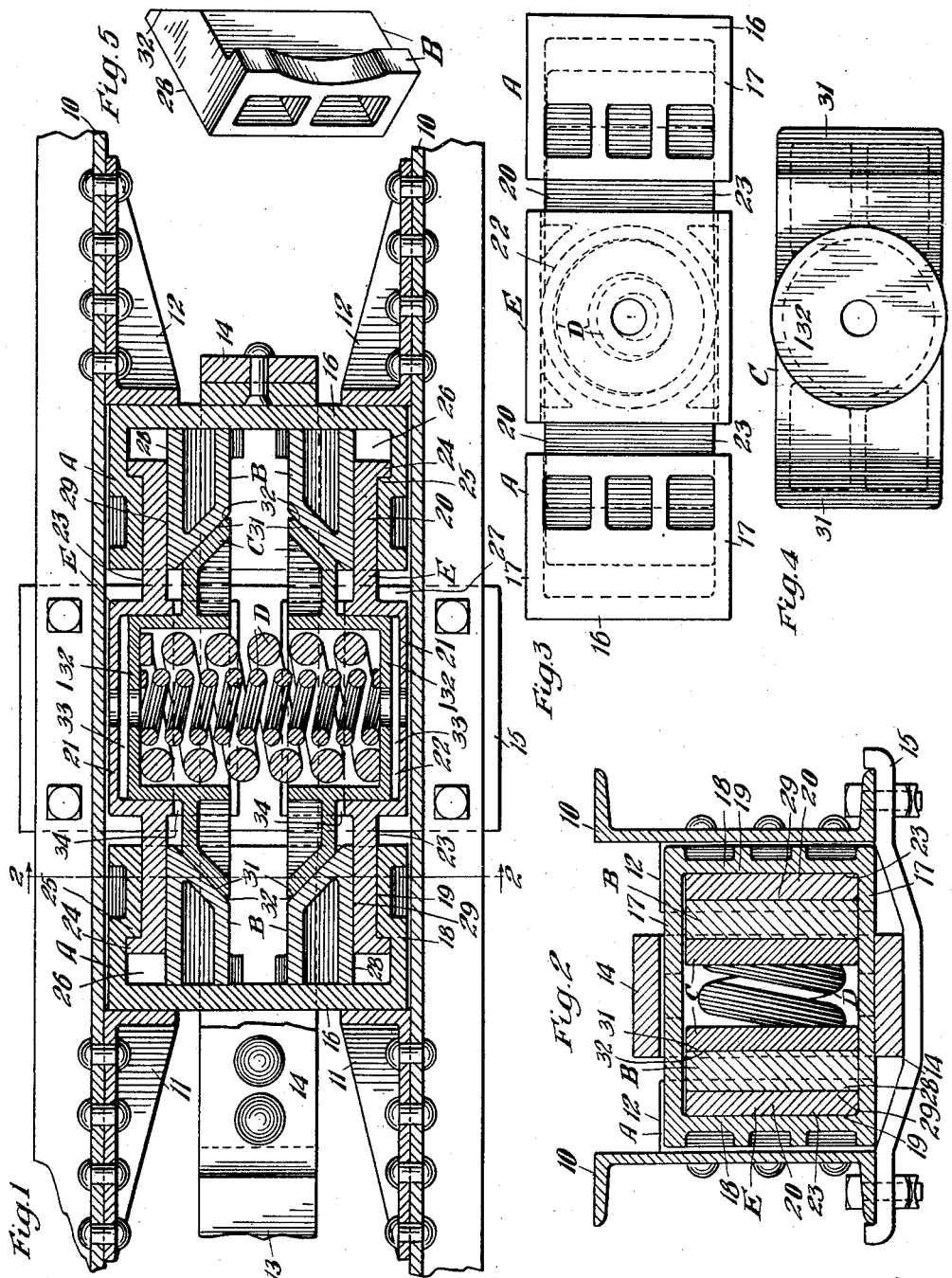

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,395,352. Specification of Letters Patent. Patented Nov. 1, 1921.

Application filed May 26, 1920. Serial No. 384,438.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of this invention is to provide a compact friction shock absorbing mechanism especially adapted for railway draft riggings wherein are obtained a plurality of sets of coöperating longitudinally extending friction surfaces and a plurality of diagonally extending friction surfaces whereby large frictional areas are obtained with consequent high capacity.

In the drawing forming a part of this specification, Figure 1 is a horizontal longitudinal sectional view of a portion of a railway draft rigging showing my improvements in connection therewith. Fig. 2 is a vertical transverse sectional view taken substantially on the line 2—2 of Fig. 1. Fig. 3 is a side elevational view of the shock absorbing mechanism proper. Fig. 4 is a side elevational view of one of the combined friction shoes and spring caps. And Fig. 5 is a detail perspective of one of the wedges employed in the construction.

In said drawing, 10—10 denote channel shaped center or draft sills of a railway car to the inner faces of which are secured front stop lugs 11 and rear stop lugs 12 spaced the standard distance apart. A portion of a drawbar is indicated at 13 to which is rigidly attached a yoke 14 of well known form. The yoke, and shock absorbing mechanism proper therewithin, are supported by a detachable saddle plate 15.

The improved shock absorbing mechanism proper, as shown, comprises, broadly, two combined end followers and friction shells A—A; four independent end wedges B—B, two at each end; two transversely movable opposed combined spring caps and friction shoes C—C; a transversely arranged spring resistance D; and a pair of outer friction plates or slides E—E.

The members A—A are of like construction and each embodies a transverse end wall 16 adapted to act as a follower, upper and lower parallel walls 17—17; and side walls 18—18; the latter being provided on their inner sides with longitudinally extending flat friction surfaces 19—19. The friction plates or slides E are also of like construction and each is formed with two end plates proper 20—20 and an intermediate integral offset square section 21 which is provided on its interior with a circular cup-like recess 22. Each plate section proper 20 provides an outer friction surface 23 adapted to coöperate with an opposed friction surface 19 of a member A. The slides E are formed at their extreme ends with outwardly turned flanges 24 adapted to engage with shoulders 25 formed on the interiors of the members A so as to limit the outward movement of the members A with respect to the slides E. The space between the ends of the slides E and the end wall 16 of the members A as indicated at 26 will be made substantially equal to the space indicated at 27 between the inner edges of the members A and the opposed shoulders on the slides E formed by the sections 21 and these spaces will be made such as to determine the compressive stroke of the mechanism.

The four end wedges B are of like construction and each is formed with an outer longitudinally extending friction surface 28 which is adapted to slide upon and coöperate with a corresponding inner friction surface 29 on a member E. Each shoe B is furthermore provided with an inclined wedging friction surface 30 at its inner end adapted to coöperate with a correspondingly inclined friction wedge surface 31 formed on a shoe C. The outer ends of the wedges B engage the end walls 16 of the members A and will be actuated in unison with the latter as clearly apparent from the drawing.

The two laterally movable friction shoes C are of like construction and each, in addition to its end wedge surfaces 31 heretofore described, is provided with an outwardly extending cup-shaped spring cap or boss 132 within which is accommodated one end of the spring D. The cup-shaped bosses 32 slidingly fit within the recesses 22 of the slides F heretofore described.

It will be noted in Fig. 1 that clearances are left as indicated at 33 and 34 between the respective sets of members C and E so that, as wear on the various friction surfaces occurs, the shoes C can gradually move outwardly with respect to the slides E and thus compensate for the wear as will be understood by those skilled in the art.

The operation is as follows. Assuming an inward or buffing movement of the drawbar, the front shell A will be moved rearwardly while the rear shell A remains stationary. In this connection, the front set of end wedges B will move in unison with the front shell A so that friction will be generated between the shells A and the members E; between the various end wedges B and the members E; and between the end wedges B and the two friction shoes C. By introducing the friction slides E, I obtain four additional sets of friction surfaces as compared with other friction mechanisms of this general type. All of the parts may be formed as castings so as to reduce the initial cost and the entire mechanism may be used in the standard spacing now provided for on railway cars. Various changes and modifications may be made without departing from the spirit of the invention and all such changes and modifications are contemplated as come within the scope of the claims appended hereto.

I claim:

1. In a friction shock absorbing mechanism, the combination with end members relatively movable toward and from each other and provided with interior friction surfaces parallel to the line of relative movement; of a friction member having end sections, the outer surfaces of which frictionally coöperate with said interior friction surfaces of the shells; end friction wedges movable in unison with said end members and having friction surfaces on their outer sides frictionally coöperable with the inner surfaces of said end sections of said friction member; a friction shoe movable transversely of the line of relative movement of said end members and having wedge shaped ends coöperable with said friction wedges; and spring means for yieldingly resisting transverse movement of said friction shoe.

2. In a friction shock absorbing mechanism, the combination with a pair of end members relatively movable toward and from each other, each of said end members being provided with a pair of opposed friction surfaces extending parallel to the line of relative movement; of a pair of outer opposed friction members, each member having end sections provided with friction surfaces on their outer sides coöperable with the corresponding opposed friction surfaces of said end members; a pair of friction wedges associated with each end member, each friction wedge having a wedge surface at its inner end and an outer longitudinally extending friction surface coöperable with the corresponding inner surface of one of said end sections; a pair of friction shoes disposed within said outer friction members and each having end wedge sections coöperable with said friction wedges; and spring means interposed between said shoes to yieldingly resist relative approach thereof.

3. In a friction shock absorbing mechanism, the combination with a pair of end members relatively movable toward and from each other, each of said end members being provided with a pair of opposed friction surfaces extending parallel to the line of relative movement; of a pair of outer opposed friction members, each member having end sections provided with friction surfaces on their outer sides coöperable with the corresponding opposed friction surfaces of said end members; a pair of friction wedges associated with each end member, each friction wedge having a wedge surface at its inner end and an outer longitudinally extending friction surface coöperable with the corresponding inner surface of one of said end sections; a pair of friction shoes disposed within said outer friction members and each having end wedge sections coöperable with said friction wedges; spring means interposed between said shoes to yieldingly resist relative approach thereof; and coöperating shoulders on said end members and outer friction members arranged to limit separating movement therebetween.

4. In a friction shock absorbing mechanism, the combination with a pair of follower-friction shells, each having a pair of opposed friction surfaces on its interior; of a pair of friction slides, each slide having a plate section at each end thereof and each section having inner and outer longitudinally extending friction surfaces, the outer surfaces coöperating with those of the shells; a pair of wedges within each shell and movable in unison therewith, each wedge having an outer friction surface coöperable with an opposed inner friction surface of one of said plate sections; a pair of transversely movable friction shoes disposed between said slides and each having end wedge sections coöperable with said first named wedges; and spring means interposed between said shoes to yieldingly resist relative movement therebetween.

5. In a friction shock absorbing mechanism, the combination with a pair of follower-friction shells, each having a pair of opposed friction surfaces on its interior; of a pair of friction slides, each slide having a plate section at each end thereof and each section having inner and outer longitudinally extending friction surfaces, the outer surfaces coöperating with those of the shells; a pair of wedges within each shell and movable in unison therewith, each wedge having an outer friction surface coöperable with an opposed inner friction surface of one of said plate sections; a pair of transversely movable friction shoes disposed between said slides and each having end wedge sections coöperable with said first named wedges; and spring means interposed between said shoes to yieldingly resist relative movement therebetween, said friction shoes being slidably guided within said slides.

In witness that I claim the foregoing I have hereunto subscribed my name.

JOHN F. O'CONNOR.

Witness:
PAULINE M. MERRICK.